United States Patent
Kogiantis et al.

(10) Patent No.: US 10,454,533 B1
(45) Date of Patent: Oct. 22, 2019

(54) DOPPLER ESTIMATION AND COMPENSATION FOR WIRELESS COMMUNICATION SYSTEMS

(71) Applicant: Vencore Labs, Inc., Basking Ridge, NJ (US)

(72) Inventors: Achilles Kogiantis, New York, NY (US); Kiran Meghashyam Rege, Marlboro, NJ (US); William Harvey Johnson, Rumson, NJ (US); Anthony A. Triolo, Basking Ridge, NJ (US)

(73) Assignee: Vencore Labs, Inc., Basking Ridge, NJ (US)

( * ) Notice: Subject to any disclaimer, the term of this patent is extended or adjusted under 35 U.S.C. 154(b) by 0 days.

(21) Appl. No.: 16/134,340

(22) Filed: Sep. 18, 2018

Related U.S. Application Data

(60) Provisional application No. 62/575,712, filed on Oct. 23, 2017.

(51) Int. Cl.
| | | |
|---|---|---|
| *H04B 1/00* | (2006.01) | |
| *H04B 7/01* | (2006.01) | |
| *H04L 27/00* | (2006.01) | |
| *H04L 27/26* | (2006.01) | |

(52) U.S. Cl.
CPC ........... *H04B 7/01* (2013.01); *H04L 27/0014* (2013.01); *H04L 27/266* (2013.01); *H04L 2027/0026* (2013.01)

(58) Field of Classification Search
CPC ..... H04B 7/01; H04L 27/0014; H04L 27/266; H04L 2017/0026
See application file for complete search history.

(56) References Cited

U.S. PATENT DOCUMENTS

| | | | |
|---|---|---|---|
| 2011/0176479 A1 | 7/2011 | Booton et al. | |
| 2013/0143503 A1* | 6/2013 | Li | H04W 24/02 455/63.1 |
| 2014/0153498 A1* | 6/2014 | Rousu | H04W 8/24 370/329 |
| 2017/0374707 A1* | 12/2017 | Dai | H04B 1/707 |

* cited by examiner

*Primary Examiner* — Tuan Pham
(74) *Attorney, Agent, or Firm* — Heslin Rothenberg Farley & Mesiti P.C.; Stephen P. Scuderi

(57) ABSTRACT

A method of estimating and compensating for Doppler frequency shifts includes providing an accurate reference device for generating an accurate reference frequency in a Doppler estimation and compensation (DEC) system, the DEC system being electrically connected to a user device. The DEC system receives one of a downlink signal from a base station and an uplink signal from the user device. The one of the downlink signal and the uplink signal is compared to the accurate reference frequency. An estimate of a Doppler frequency shift associated with the one of the downlink signal and the uplink signal is determined. An offset Doppler frequency shift of opposite sign as the Doppler frequency shift is added to the one of the downlink signal and uplink signal to provide a compensated signal. The compensated signal is transmitted to one of the base station and user device.

20 Claims, 4 Drawing Sheets

DOPPLER ESTIMATION AND COMPENSATION FOR WIRELESS COMMUNICATION SYSTEMS

GOVERNMENT RIGHTS STATEMENT

This invention was made with U.S. Government support under Agreement No. W125QKN-15-9-1004 awarded by the ACC-NJ to the National Spectrum Consortium (NSC). The Government has certain rights in the invention.

TECHNICAL FIELD

The present invention relates to wireless communications systems and methods of making the same. More specifically, the invention relates to systems and methods of estimating and compensating for Doppler shifts in wireless communication systems.

BACKGROUND

In commercial cellular wireless systems (for example, those based on the well-known 3GPP LTE standard for 4G wireless communication) user devices and base stations are designed to support communication links where the relative speed between a base station and a user device can be, for example, up to 400-500 km/hour. The greater the relative speed between a user device and a base station, the larger the well-known Doppler shift that will occur during a transmission from one to the other.

A user device can be a cell phone or other similar device and a base station can be a cell tower or other similar device. Generally, the base station is stationary and the user device is mobile, but it is possible that either or both the user device and base station can be moving relative to a fixed reference point such as the earth.

Such wireless communication systems typically are full duplex systems where communication can occur in a downlink transmission (i.e., transmission from the base station to the user device) and an uplink transmission (i.e., transmission from the user device to the base station) simultaneously. Full duplex systems can be either frequency division duplex (FDD) systems or time division duplex (TDD) systems. In a FDD system, the downlink and the uplink transmissions communicate over two separate frequency bands and associated center frequencies. Alternatively, in TDD systems, the downlink and uplink transmissions communicate over a single frequency band and associated center frequency. However, the uplink and downlink communications are separated in time. In a full duplex communication system, both the uplink signal and downlink signal must remain active. If either the uplink or downlink signal is lost for a significant period of time, the full duplex connection will fail.

A receiver in a user device typically derives the downlink frequency, which includes a Doppler shift if the user device is moving relative to the base station, by locking on to the received downlink signal from the base station. The user device will typically introduce this Doppler shift into the uplink signal it transmits towards the base station. As a consequence, the uplink signal received by the base station may experience a Doppler shift that is twice that measured by the user device.

User devices can typically handle relatively large Doppler shifts, for example, several kHz. However, base stations generally cannot handle such large Doppler shifts. For example a base station may only be able to handle a Doppler shift of up to 500 Hz. This may be due to the fact that base stations must be designed to handle signals from multiple user devices with multiple Doppler shifts. As a result of this design requirement, base stations may not generally be capable of detecting and adjusting to such relatively large Doppler shifts. Problematically, if the Doppler shift from a user device is outside of a base station receiver's capability, the base station will fail to decode the signals from the user device and the communication link will break down.

This problem is exacerbated as the relative speed between a user device and base station increases, along with an associated increase in Doppler shift. For example, in an LTE-based air-to-ground communication system, the user devices are located in airplanes that move at speeds that are several times higher than the typical speed limits allowed by commercial LTE systems.

Accordingly, there is a need for a system and method that can dynamically detect and estimate Doppler shifts in a wireless communication system. Moreover, there is a need to detect, estimate and compensate for Doppler frequency shifts on either, or both, the uplink transmission signal and the downlink transmission signal.

BRIEF DESCRIPTION

The present invention offers advantages and alternatives over the prior art by providing a Doppler estimation and compensation system that can detect, estimate and compensate for Doppler frequency shifts on either an uplink transmission signal, a downlink transmission signal or both.

A method of estimating and compensating for Doppler frequency shifts in a wireless communication system in accordance with one or more aspects of the present invention includes providing an accurate reference device for generating an accurate reference frequency in a Doppler estimation and compensation (DEC) system. The DEC system is electrically connected to the user device. The DEC system receives one of a downlink signal from a base station and an uplink signal from the user device. The one of the downlink signal and the uplink signal is compared to the accurate reference frequency. An estimate of a Doppler frequency shift associated with the one of the downlink signal and the uplink signal is determined based on the comparison. An offset Doppler frequency shift of opposite sign as the Doppler frequency shift is added to the one of the downlink signal and uplink signal to provide a compensated signal. The compensated signal is transmitted to one of the base station and user device.

DRAWINGS

The invention will be more fully understood from the following detailed description taken in conjunction with the accompanying drawings, in which.

DETAILED DESCRIPTION

Figure 1:
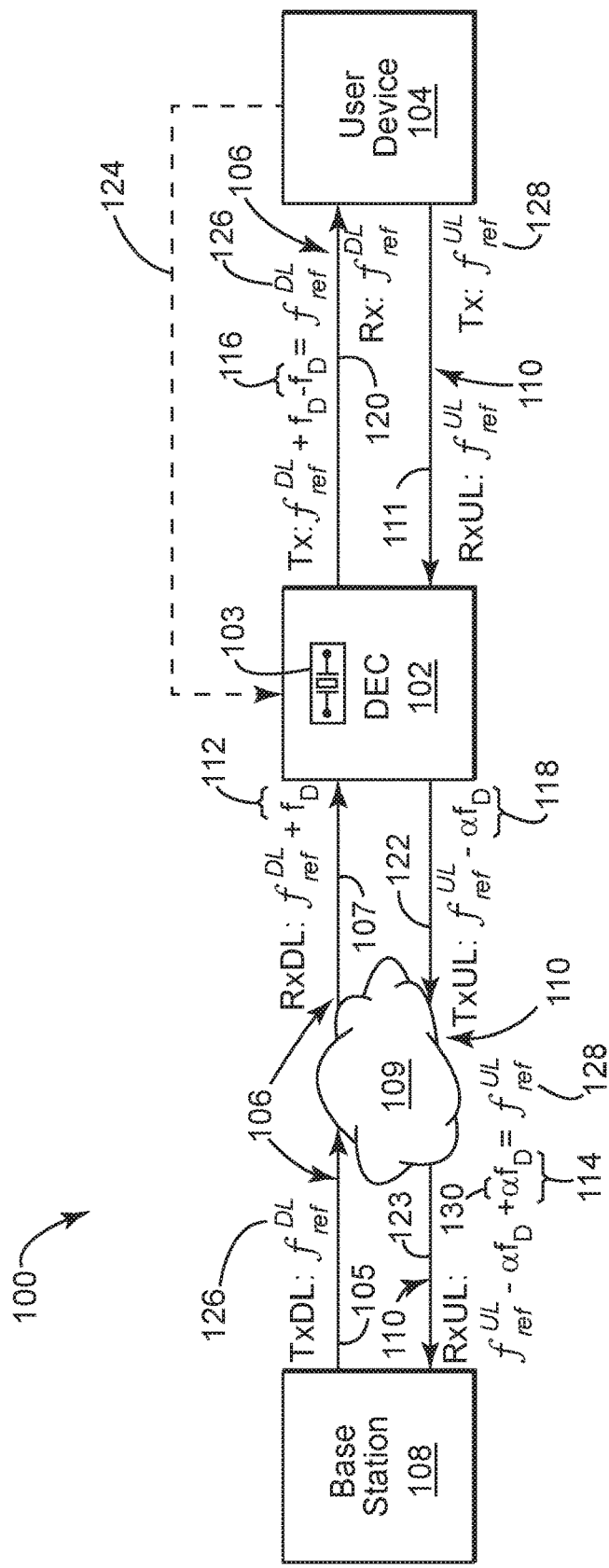
FIG. 1 is a schematic diagram of an exemplary embodiment of a wireless communication system utilizing a DEC system in accordance with the present invention.

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Referring to FIGS. 1, 2, 3 and 4 generally, schematics of exemplary alternative embodiments of wireless communication systems 100 (FIG. 1), 200 (FIG. 2), 300 (FIG. 3) and 400 (FIG. 4) are presented. The systems 100, 200, 300, 400 are capable of estimating and compensating for Doppler frequency shifts between a base station 108 and a user device 104 on either a downlink signal (or transmission) 106 or an uplink signal (or transmission) 110. The downlink signal 106 and uplink signal 110 being transmitted between the base station 108 and user device 104 through a wireless transmission medium 109, such as air, space or the like.

Each wireless communication system 100, 200, 300, 400 includes a Doppler estimation and compensation (DEC) system 102 that is electrically connected to a user device 104. The DEC system 102 includes an accurate reference device 103 for generating and transmitting an accurate reference frequency. The accurate reference device 103 may include, by way of example but not limitation, an oven controlled crystal oscillator (OCXO), a microprocessor compensated crystal oscillator (MCXO) or an atomic oscillator (such as a rubidium or cesium based atomic oscillator). The accurate reference device 103 generates and transmits a reference frequency that has a predetermined range of accuracy which is generally measured in parts per billion (ppb). For example, accurate reference devices 103 based on OCXOs and MCXOs may have reference frequency accuracy ranges in the order of 10 to 50 ppb. Also, accurate reference devices 103 based on atomic oscillators may have reference frequency accuracy ranges that are in the order of 0.1 to 0.5 ppb.

For purposes herein, a reference frequency includes a center frequency (which also may be referred to herein as a nominal frequency) that is centrally disposed within a tolerance band (or accuracy range) of frequencies. The accurate reference device 103 may generate a reference frequency with an accuracy range that is equal to or less than 100 ppb, equal to or less than 50 ppb and equal to or less than 10 ppb.

The reference frequency generated from the accurate reference device 103 is significantly more accurate than an internal reference frequency generated by a local oscillator device (not shown) frequently used in user device 104. For example, the reference frequency from an accurate reference device 103 may be greater than an order of magnitude more accurate than an internal reference frequency generated from a local oscillator used in user device 104.

As referred to herein, an internal reference frequency of a user device 104 is a reference frequency that is used internally within the user device 104 for comparison with downlink or uplink signals. However, the internal reference frequency of a user device 104 is not transmitted externally from the user device in an uplink 110 or downlink 106 signal.

A local oscillator device (not shown) used to generate such an internal reference frequency may be based on, for example, a temperature compensation crystal oscillator (TCXO). The local oscillator device may generate an internal reference frequency with an accuracy range that is equal to or greater than 1000 ppb (or one part per million (ppm)).

Without the use of a DEC 102, a user device 104 frequently derives a transmittable reference frequency from the measured center (or reference) frequency of the downlink signal 106 received from a base station 108. The user device 104 may do this by first locking onto a downlink signal 106 that has a center frequency within a predetermined range of the internal reference frequency generated from the local oscillator device. For example, a user device 104 may be electronically configured to lock onto downlink signals 106 that have center frequencies which are within plus or minus 7.5 kHz of the internal reference frequency of its local oscillator device.

Thereafter, the user device 104 may compare the center frequency of the downlink signal 106 to the internal reference frequency generated from the local oscillator device. The user device 106 may then adjust its output to provide a transmittable reference frequency that matches the center frequency of the downlink signal 106.

However, the center frequency of the downlink signal 106 received by the user device 104 may include a downlink Doppler frequency shift, which may be imposed onto the derived reference frequency transmitted by the user device 104 in an uplink signal 110. Under certain circumstances, such as if the relative speed between the user device 104 and base station 108 were greater than 500 km/hour, the Doppler frequency shift could adversely affect the communications link between the base station 108 and user device 104.

Furthermore, the local oscillator device in a user device 104 is not accurate enough to be used to estimate the Doppler effect alone. That is, if the local oscillator device were used to estimate the Doppler effect (without the assistance of a DEC 102), the relatively large inaccuracies of the local oscillator (e.g., 1000 ppb) could adversely affect the estimate.

In contrast, the DEC 102 does not derive its reference frequency from a center frequency of the received downlink signal 106. Rather, the DEC 102 utilizes the accurate reference device 103 to generate a reference frequency independent of the center (or reference) frequency received from the downlink signal 106. As such, the accurate reference device 103 may generate a reference frequency whose error range (a measure of accuracy) is equal to or less than 100 ppb, equal to or less than 50 ppb and equal to or less than 10 ppb. As will be explained in greater detail herein, because the reference frequency generated from the DEC 102 does not include a Doppler shift, it can be used to estimate the Doppler shift of uplink 110 and downlink 106 signals. Further, the relatively small inaccuracies of the reference frequency generated from the DEC 102 will not significantly affect the estimate.

The DEC system 102 can be in the form of a module, which attaches to the user device 104. Alternatively, the DEC system 102 can be integrated into the electronics of user device 104.

As an overview, the DEC system 102 of wireless communication systems 100, 200, 300 and 400 is capable of receiving a downlink signal 106 from a base station 108 and an uplink signal 110 from the user device 104. The DEC system 102 is capable of comparing either the downlink signal 106 or the uplink signal 110 to the accurate reference frequency generated by the accurate reference device 103 within the DEC system 102.

For example, by comparing the downlink signal 106 with the output of the accurate reference device 103, the DEC system 102 may obtain an estimate of a downlink Doppler frequency shift $f_D$ (ref. no. 112 in FIG. 1) associated with the downlink signal 106 transmitted from the base station 108. It can then add a downlink offset Doppler frequency shift $-f_D$ (ref. no. 116 in FIG. 1) to the downlink signal 106 to compute a compensated downlink signal 120, which is then provided to the user device 104. When the user device 104 transmits, the DEC system 102 computes a scaling of its estimate of the downlink Doppler frequency shift $f_D$ (ref. no. 112 in FIG. 1) to determine an uplink offset Doppler frequency shift $-\alpha f_D$ (ref. no. 118 in FIG. 1)). The DEC system 102 adds the uplink offset Doppler frequency shift $-\alpha f_D$ to the uplink signal 110 to provide an uplink compensated signal 122 that is then transmitted to the base station 108 in FIG. 1. The scaling parameter a depends on the ratio of the center frequencies associated with uplink and downlink transmissions. The offset Doppler frequency shift 116, 118 is substantially of the same magnitude and opposite sign as the corresponding Doppler frequency shift 112, 114.

Referring more specifically to FIG. 1, the wireless communication system 100 illustrates an embodiment where the DEC 102 compensates for Doppler shifts 112, 114 on both the downlink signals 106 and uplink signals 110. It is important to note, that the downlink signal 106 represents the signal transmitted along the entire transmission path from base station 108 to user device 104. The downlink signal 106 can be divided into the following three segments:
  the downlink transmitted signal 105, which is initially transmitted from the base station 108 through the transmission medium 109;
  the downlink received signal 107, which is received by the DEC 102 and subjected to a Doppler shift 112 after being transmitted through the transmission medium 109; and
  the downlink compensated signal 120, which is transmitted from the DEC 102 to the user device 104 with a near zero Doppler shift.

It is also important to note, that the uplink signal 110 represents the signal transmitted along the entire transmission path from user device 104 to base station 108. The uplink signal 110 can be divided into the following three segments:
  the uplink transmitted signal 111, which is initially transmitted from the user device 104 to the DEC;
  the uplink compensated signal 122, which is initially transmitted from the DEC with an uplink offset Doppler frequency shift 118 imposed thereon; and
  the uplink received signal 123, which is received by the base station 108 and subjected to a Doppler shift 114 after traveling through transmission medium 109, such that the uplink received signal 123 has a net near zero Doppler shift.

To begin with, the user device 104 starts by scanning a plurality of base stations located within its transmission range for predetermined center frequencies (or reference frequencies) and predetermined bands associated with those reference frequencies. The user device 104 will select and lock onto a single desired base station 108 out of the plurality of base stations.

However, the DEC 102 receives signals from each of the local base stations within its transmission range. Therefore, the DEC system 102 requires some indication as to which base station is the desired base station 108 that the user device 104 locks onto in order to be able to compensate for Doppler shifts 112 on the downlink signal 106. This can be accomplished by the user device 104 providing an indication signal 124 to the DEC system 102 designating the base station 108 as a desired base station out of a plurality of base stations, wherein the desired base station 108 is the single base station that the user device 104 has decided to communicate with.

Once user device 104 has locked onto base station 108, the DEC system 102 will receive a downlink signal 106 transmitted from the base station 108. The downlink signal 106 transmitted from base station 108 has its center frequency substantially equal to a downlink reference frequency ($f_{ref}^{DL}$) associated with it (126), and when this signal is received by the DEC system 102, the downlink received signal 106 will have its center frequency shifted by an amount equal to a downlink Doppler frequency shift 112. In other words, the downlink received signal 107 will be a frequency-shifted version of the downlink signal 106, with its center frequency at the sum of the downlink reference frequency 126 and the downlink Doppler frequency shift 112. The downlink signal 106 as well as the downlink received signal 107 will include data to be communicated to user device 104. The downlink Doppler frequency shift 112 will have been induced into the downlink reference frequency 126 due at least in part to the relative speed between the base station 108 and user device 104.

The DEC 102 will compare the downlink received signal 107 to its own accurate reference frequency to determine an estimate of the downlink Doppler frequency shift 112. The DEC 102 will then add a downlink offset Doppler frequency shift 116 to the downlink received signal 107 of substantially the same magnitude and opposite sign as the downlink Doppler frequency shift 112 to provide a downlink compensated signal 120. The net result will be that downlink compensated signal 120 will have its center frequency substantially equal to the downlink reference frequency 126. The DEC system 102 will then transmit the downlink compensated signal 120 to the user device 104.

Once the user device 104 is ready to communicate back to the base station 108, the user device 104 will generate an uplink signal 110, which at this point in the transmission is considered to be the uplink transmitted signal 111, which has its center frequency at the reference frequency ($f_{ref}^{UL}$) 128. The uplink transmitted signal 111 will contain data to be communicated to the base station 108. The DEC system 102 will receive the uplink transmitted signal 111 from the user device 104.

The DEC system 102 then computes an uplink offset Doppler frequency shift 118 by scaling the downlink offset Doppler frequency shift 116 by a factor α. The factor α may equal the ratio of the center frequencies associated with the uplink transmitted signal 111 and the downlink transmitted signal 105. The DEC system 102 adds the uplink offset Doppler frequency shift 118 to the uplink transmitted signal 111 to produce the uplink compensated signal 122. The DEC system 102 then transmits the uplink compensated signal 122 toward the base station 108. The uplink Doppler frequency offset 118 will be substantially equal in magnitude and opposite in sign to that of the uplink Doppler frequency shift 114 that will occur when the uplink compensated signal 122 reaches the base station 108 as the uplink received signal 123. Thus, the uplink received signal 123 that is actually received by the base station 108 will have its center frequency close to the uplink reference frequency ($f_{ref}^{UL}$) 128.

It is possible that the downlink reference frequency signal 126 and the uplink reference frequency signal 128 may not be the same frequency. For example, the wireless communication system 100 may be a frequency division duplex (FDD) system, wherein the downlink and the uplink transmissions occur over two separate frequency bands. When the center frequencies 126, 128, associated respectively with downlink and uplink transmissions, are not equal, the Doppler frequency shifts 112, 114 will also not be equal. Rather, the ratio of the Doppler frequency shifts will be equal to the ratio of the corresponding reference frequencies.

Since the DEC has measured and determined the downlink Doppler frequency shift 112, it can apply a scaling factor α (ref. no. 130 in FIG. 1) to the downlink frequency shift 112 to provide the uplink frequency shift 114 that will be induced into the compensated signal 122 when it is transmitted to the base station 108. More specifically, the DEC will generate the uplink Doppler frequency shift 114 such that it is substantially equal to downlink Doppler frequency shift 112 multiplied by a scaling factor 130 that is proportional to the ratio of the uplink reference frequency 128 to the downlink reference frequency 126. If the uplink and downlink reference frequencies 126, 128 are substantially equal, the scaling factor 130 will be 1 and the downlink and uplink Doppler frequency shifts 112, 114 will also be equal.

Figure 2:
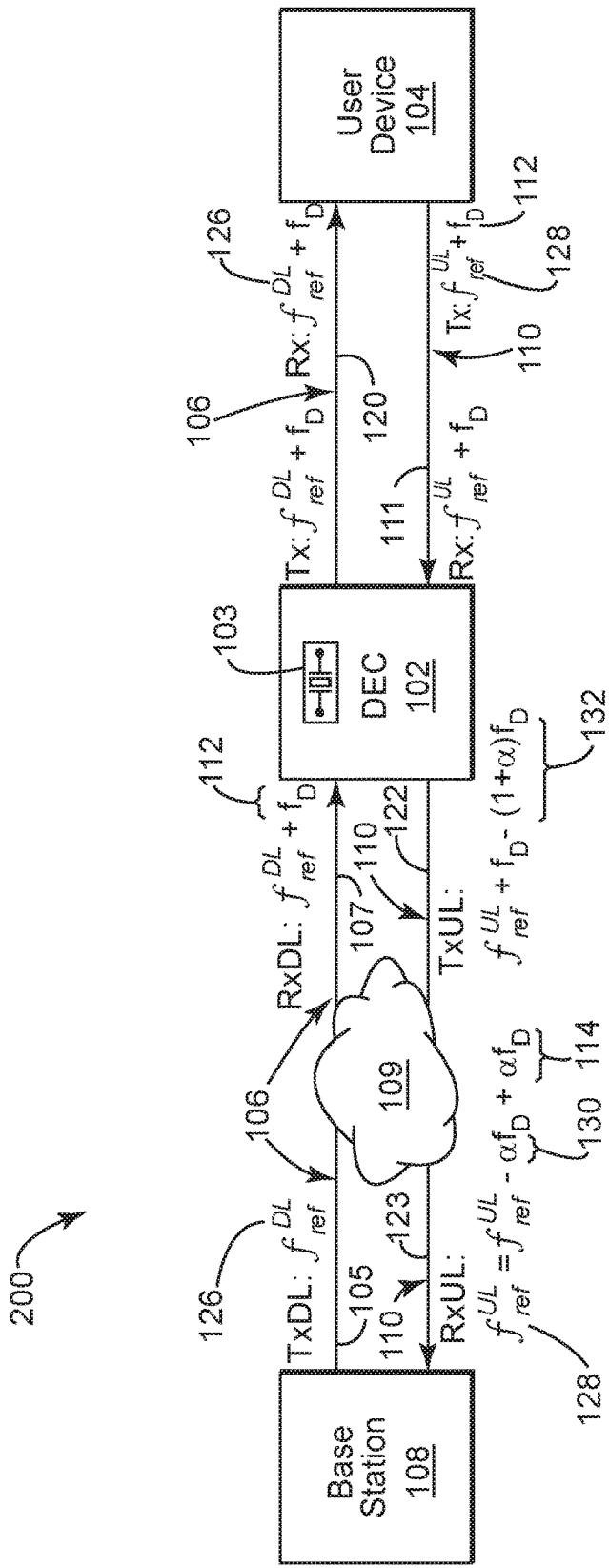
FIG. 2 is a schematic diagram of an alternative exemplary embodiment of a wireless communication system utilizing a DEC system in accordance with the present invention.

Referring to FIG. 2, the wireless communication system 200 illustrates an embodiment where the DEC 102 compensates for Doppler shifts 112, 114 on the uplink signal 110 only. No compensation is provided on the downlink signal 106. Rather the downlink received signal 107, which is a Doppler-frequency-shifted version of the downlink transmitted signal 105, is transmitted to the user device 104 without compensating for downlink Doppler frequency shift 112.

In this embodiment, the DEC 102 receives the downlink received signal 107 and transmits it substantially unaltered to the user device 104 as the downlink compensated signal 120. The user device 104 locks on to the downlink compensated signal 120 and determines the amount by which the carrier frequency associated with this signal 120 differs from the center frequency generated from its own local oscillator. This frequency difference equals $f_D+\Delta$, where $f_D$ represents the downlink Doppler shift 112 and $\Delta$ represents the difference between the downlink reference frequency ($f_{ref}^{DL}$) 126 and the center frequency generated from the local oscillator of the user device 104. When the user device 104 generates an uplink transmitted signal 111, it adds this difference to the center frequency generated from its own local oscillator. (That is, it shifts the center frequency of the local oscillator output by $f_D+\Delta$.)

Therefore, when, as described above, the user device 104 shifts the frequency of the local oscillator output by an amount equal to $f_D+\Delta$, the center frequency of the resulting signal substantially equals $f_{ref}^{UL}+f_D$. In other words, the center frequency associated with the uplink transmitted signal 111 is $f_{ref}^{UL}+f_D$.

By comparing the center frequency of the uplink transmitted signal 111 with its own accurate uplink reference frequency, the DEC system 102 will estimate the downlink Doppler frequency shift 112. The DEC system 102 will then add an uplink offset Doppler frequency shift 132 to the uplink transmitted signal 111 to obtain the uplink compensated signal 122, which is then transmitted toward the base station 108. The uplink offset Doppler frequency shift 132 in the embodiment of FIG. 2 will be substantially equal in magnitude and opposite in sign to the downlink Doppler frequency shift 112 plus an uplink Doppler frequency shift 114 that will occur when the uplink signal 110 is received by the base station 108 as the uplink received signal 123.

If the downlink reference frequency 126 and the uplink reference frequency 128 are the same then the uplink offset Doppler frequency shift 132 will be substantially equal to twice the magnitude of the Doppler frequency shift 112 and opposite in sign.

When the reference frequencies 126, 128 are not equal, DEC system 102 can apply the scaling factor 130 to the downlink frequency shift 112 to provide the uplink offset Doppler frequency shift 132. More specifically, the DEC 102 will generate the uplink offset Doppler frequency shift 132 such that it is substantially equal to downlink Doppler frequency shift 112 multiplied by one plus the scaling factor 130, wherein the scaling factor 130 is proportional to the ratio of the uplink reference frequency 128 to the downlink reference frequency 126. The uplink signal 110, when transmitted by the DEC system 102, is an uplink compensated signal 122 that is transmitted toward the base station 108.

The uplink signal 110 received by the base station 108 is referred to as the uplink received signal 123. The uplink received signal 123 is a frequency-shifted version of the uplink compensated signal 122 that is transmitted by the DEC system 102. That is, the center frequency of the uplink received signal 123 is shifted from that of the center frequency associated with the uplink compensated signal 122 by an amount equal to the uplink Doppler frequency shift 114. Since the center frequency of the uplink compensated signal 122 equals the sum of the uplink reference frequency 128 and the negative of the uplink Doppler frequency shift 114, the center frequency of the uplink received signal 123, when it is received by the base station 108, will be substantially equal to the uplink reference frequency 128.

Figure 3:
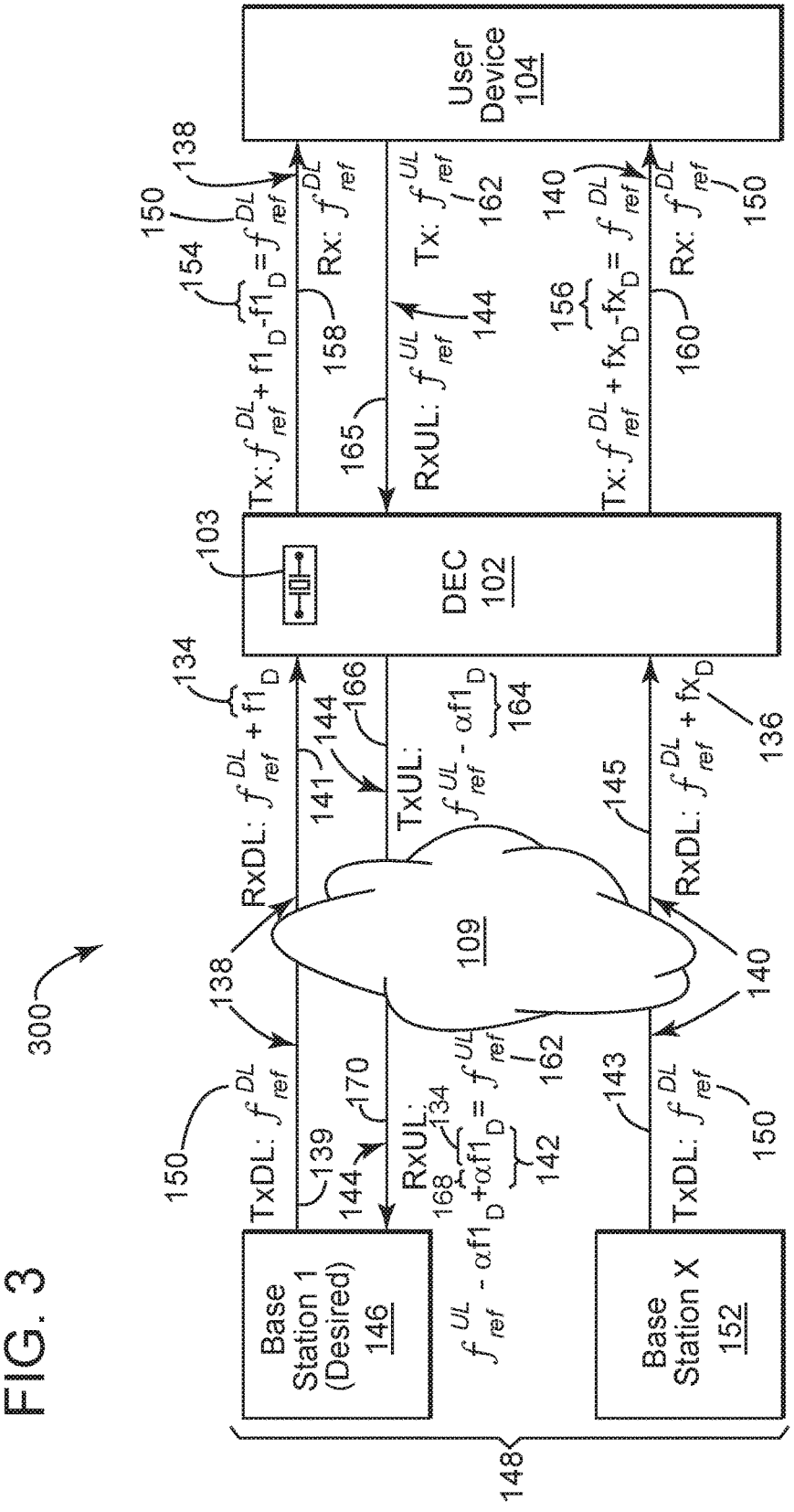
FIG. 3 is a schematic diagram of another alternative exemplary embodiment of a wireless communication system utilizing a DEC system in accordance with the present invention.

Referring to FIG. 3, the wireless communication system 300 illustrates an embodiment where the DEC 102 compensates for any number of multiple downlink Doppler frequency shifts ($f1_D$ (ref. no. 134 in FIG. 3) through $fx_D$ (ref. no. 136 in FIG. 3)) on multiple downlink signals 138 through 140. However the communication system 300 only compensates for a single uplink Doppler frequency shift 142 on a single uplink signal 144 that is transmitted to a desired base station 146 selected by the user device 104. In this embodiment, there is no indication signal (for example, indication signal 124 of FIG. 1) from the user device 104 to provide the DEC 102 with an indication as to which base station is the desired base station 146.

It is important to note, that the downlink signals 138, 140 represent the signals transmitted along the entire transmission paths from base stations 146, 152 to user device 104. The downlink signal 138 can be divided into the following three segments:
the downlink transmitted signal 139, which is initially transmitted from the base station 146 through the transmission medium 109;
the downlink received signal 141, which is received by the DEC 102 and subjected to a Doppler shift 134 after being transmitted through the transmission medium 109; and the downlink compensated signal 158, which is transmitted from the DEC 102 to the user device 104 with a near zero Doppler shift.

Also, the downlink signal 140 can be divided into the following three segments:

the downlink transmitted signal 143, which is initially transmitted from the base station 152 through the transmission medium 109;

the downlink received signal 145, which is received by the DEC 102 and subjected to a Doppler shift 136 after being transmitted through the transmission medium 109; and the downlink compensated signal 160, which is transmitted from the DEC 102 to the user device 104 with a near zero Doppler shift.

It is also important to note, that the uplink signal 144 represents the signal transmitted along the entire transmission path from user device 104 to base station 146. The uplink signal 144 can be divided into the following three segments:

the uplink transmitted signal 165, which is initially transmitted from the user device 104 to the DEC 102;

the uplink compensated signal 166, which is initially transmitted from the DEC with an uplink offset Doppler frequency shift 164 imposed thereon; and the uplink received signal 170, which is received by the base station 108 and subjected to a Doppler shift 142 after traveling through transmission medium 109, such that the uplink received signal 170 has a net near zero Doppler shift.

As is usually the case, the user device 104 starts by scanning a plurality of base stations 148 located within its transmission range for a predetermined downlink reference frequency signal 150. The user device 104 will select and lock onto a single desired base station 146 out of the plurality of base stations 148. In this exemplary embodiment, only two base stations are illustrated, the desired base station 1 (ref. no. 146) and base station x (ref. no. 152). However the plurality of base stations 148 may be any number of such base stations, numbering, for example, from 2 to 100 or more.

The DEC system 102 receives a plurality of downlink signals 138, 140 transmitted from the plurality of base stations 148. Each of the plurality of downlink signals 138, 140 has its center frequency at downlink reference frequency 150. When the plurality of downlink signals 138, 140 reach the DEC system, they are referred to as downlink received signals 141, 145 respectively. The downlink received signals 141, 145 are frequency-shifted versions of the downlink signals 138, 140, respectively, wherein their respective center frequencies are shifted from the downlink reference frequency 150 by amounts equal to downlink Doppler frequency shifts 134, 136, respectively. Though the downlink signals 138, 140 have substantially the same center frequency 150, the downlink Doppler frequency shifts 134, 136 are not necessarily equal.

In order to more accurately distinguish and measure each downlink signal 138, 140, the DEC system 102 may use a multi-antenna technique such as beam-forming. Such a multi-antenna technique would enhance the DEC system's 102 ability to simultaneously track multiple base stations 146, 152 and accurately measure the downlink Doppler frequency shift 134, 136 associated with each base station.

The DEC system 102 has received no indication from the user device 104 as to which base station will be the desired base station 146 that the user device has selected to communicate with. Therefore, the DEC system 102 adds a downlink offset Doppler frequency shift 154, 156 to each of the plurality of downlink received signals 141, 145.

The downlink offset Doppler frequency shifts 154, 156 are not necessarily equal and can be any number to match the number of base stations 146, 152 in the plurality of base stations 148. The downlink offset Doppler frequency shifts 154, 156 are substantially the same magnitude and opposite sign as the corresponding downlink Doppler frequency shift 134, 136 associated with each of the plurality of downlink signals 138, 140. The addition of the downlink offset Doppler frequency shifts 154, 156 to the downlink signals 138, 140 provide a plurality of downlink compensated signals 158, 160 such that their respective center frequencies are equal to the downlink reference frequency 150. The plurality of downlink compensated signals 158, 160 are transmitted to the user device 104.

The user device 104 then designates a base station out of the plurality of base stations 148 as a desired base station 146. The desired base station 146 is the single base station that the user device 104 has selected to communicate with. The user device 104 then transmits the uplink signal 144 to the DEC 102. The DEC system 102 receives the single uplink signal 144 transmitted from the user device 104. At this stage in the transmission, the center frequency of the uplink signal 144 is substantially equal to the uplink reference frequency 162 and the uplink signal 144 is the uplink transmitted signal 165.

In this embodiment of FIG. 3, the user device 104 has not communicated to the DEC which base station out of the plurality of base stations 148 is the desired base station 146 that the user device has chosen to transmit to. However, the DEC can autonomously determine which base station is the desired base station 146 by analyzing the data in the uplink transmitted signal 165. That analyzed data can then be compared to the data received from the plurality of downlink received signals 141, 145 to determine the specific desired base station 146.

In one exemplary embodiment, the DEC system 102 can, rather than fully compensating for the downlink Doppler frequency shift 134, 136, intentionally introduce different relatively small errors in the downlink offset Doppler frequency shifts 154, 156 for each base station. Because the User Device 104 will generate an uplink transmitted signal 165 that includes the intentionally induced frequency error, the DEC system 102 can determine which base station is the desired base station 146 based on a measure of the frequency error associated with the uplink transmitted signal 165.

At the DEC system 102 an uplink offset Doppler frequency shift 164 is applied to the uplink signal 144 before it is transmitted toward the base station 146. The uplink signal 144 is an uplink compensated signal 166 when it is transmitted from the DEC system 102. The uplink offset Doppler frequency shift 164 is of a substantially equal magnitude and opposite sign of the uplink Doppler frequency shift 142 that will occur in the uplink compensated signal 166 when it reaches the desired base station 146 as the uplink received signal 170.

When the uplink compensated signal 166 is received by the desired base station 146 the uplink Doppler frequency shift 142 will have been induced into the signal 166 to provide the uplink received signal 170. Therefore the center frequency associated with the uplink received signal 170 when it is received by the desired base station 146 will be substantially equal to the uplink reference frequency 162.

As previously discussed in FIGS. 1 and 2, it is possible that the downlink reference frequency 150 and the uplink reference frequency 162 may not be the same. Accordingly, DEC system 102 can apply a scaling factor 168 to the downlink Doppler frequency shift 134 to provide the uplink Doppler frequency shift 142. More specifically, the DEC 102 will generate the uplink Doppler frequency shift 142 such that it is substantially equal to downlink Doppler frequency shift 134 multiplied by the scaling factor 168, wherein the scaling factor 168 is proportional to the ratio of the uplink reference frequency 162 to the downlink reference frequency 150. If the downlink reference frequency 150 is substantially equal to the uplink reference frequency 162, the scaling factor will be substantially equal to 1 and the downlink and uplink Doppler frequency shifts 134, 142 will be equal.

In FIGS. 1 and 3, two methods have been disclosed detailing how the DEC 102 determines which base station, out of a plurality of base stations 148, is the desired base station 146 that the user device 104 has selected to communicate with. In the embodiment of FIG. 1, the user device 104 provides an indication signal 124 to the DEC 102 indicating the desired base station 146. In the embodiment of FIG. 3, the DEC autonomously determines the desired base station 146 by analyzing the data in the uplink transmitted signal 165 and comparing it to the data the DEC received from the plurality of downlink received signals 141, 145.

An alternative third possible method of establishing communication from the DEC 102 to the desired base station 146 exists, wherein the DEC 102 sends an uplink compensated signal to each base station 146, 152 of the plurality of base stations 148 without determining the desired base station 146. In that third embodiment, the DEC 102 is blind as to which base station is the desired base station 146, so the DEC sends an uplink compensated signal to all of the base stations 146, 152.

For example, the alternative third method of establishing communication to the desired base station 146 may be accomplished using beamforming techniques as follows:

1. The DEC 102 receives downlink received signal 141 from base station 146. Using beamforming techniques, the DEC 102 determines a spatial filter (filt1 (not shown)) based on data received from signal 141. The DEC 102 simultaneously receives downlink received signal 145 from base station 152. Using beamforming techniques, the DEC determines a spatial filter (filt2 (not shown)) based on data received from signal 145. The spatial filters filt1, filt2 provide data that represent mathematically formed beams that are directed toward their associated base stations 146, 152.
2. The DEC 102 measures the downlink Doppler shift 134 in signal 141 and the downlink Doppler shift 136 in signal 145. The DEC 102 then applies the downlink offset Doppler shift 154 to the downlink compensated signal 158. Additionally, the DEC 102 applies the downlink offset Doppler shift 156 to the downlink compensated signal 160. The DEC transmits the compensated signals 158, 160 to the user device
3. The DEC 102 then receives the uplink transmitted signal 165 from the user device 104.
4. The DEC 102 then applies the uplink offset Doppler frequency shift 164 to the uplink transmitted signal 165 to obtain the uplink compensated signal 166. The DEC 102 then applies a spatial filter based on measured filt1 to transmit the uplink compensated signal 166 to base station 146 while minimizing interference to base station 152.

The DEC 102 simultaneously applies a second uplink offset Doppler frequency shift (not shown) to the uplink transmitted signal 165 to obtain a second uplink compensated signal (not shown), which will be directed toward base station 152. The DEC 102 then applies a spatial filter based on measured. filt2 to transmit the second uplink compensated signal to base station 152 while minimizing interference to base station 146.

5. The DEC 102 transmits combined compensated uplink signals (i.e., the uplink compensated signal 166 and the second uplink compensated signal (not shown)) using a beam-forming array.

Figure 4:
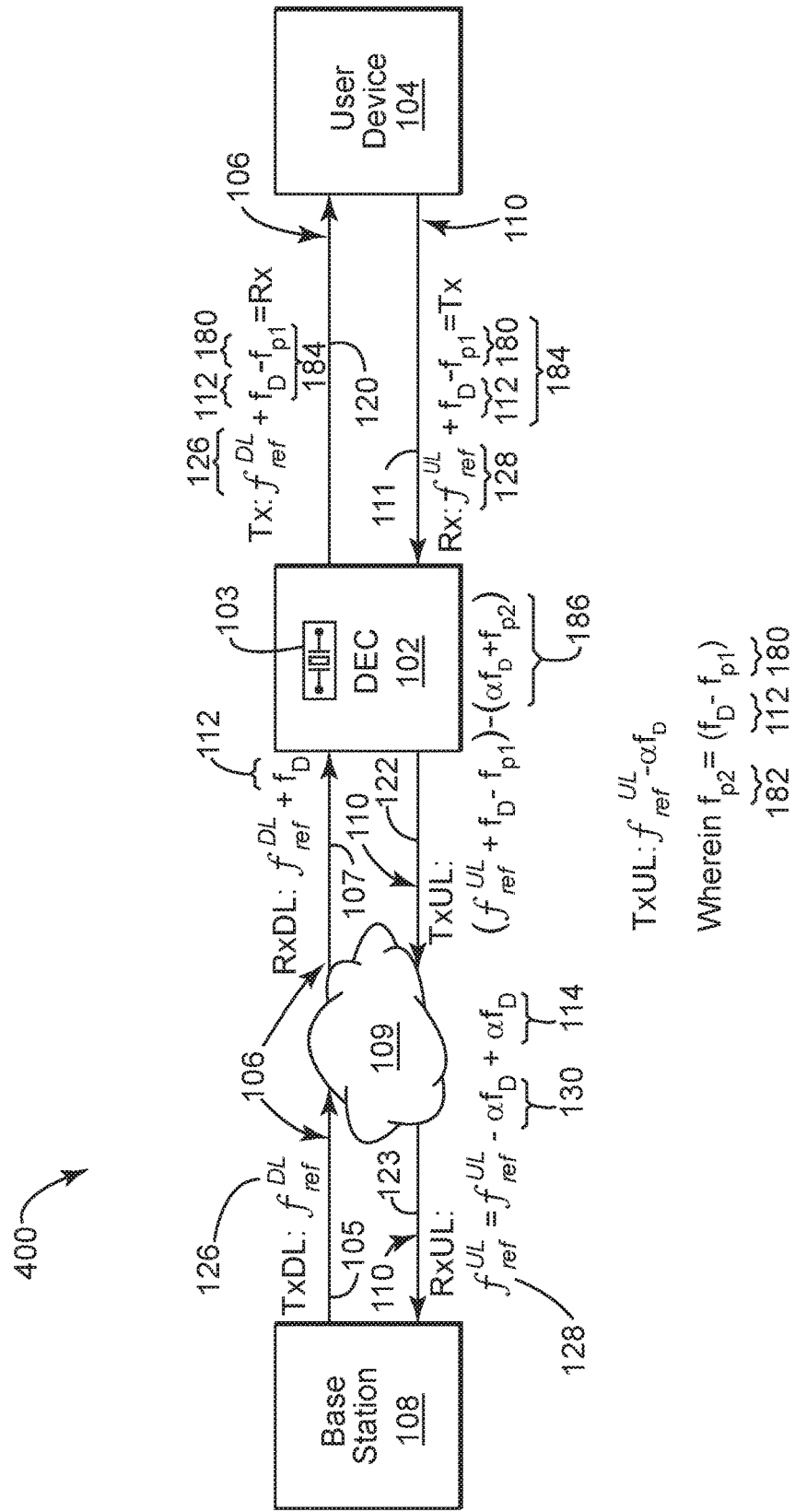
FIG. 4 is a schematic diagram of another alternative exemplary embodiment of a wireless communication system utilizing a DEC system in accordance with the present invention.

Referring to FIG. 4, the wireless communication system 400 illustrates an embodiment where the DEC 102 partially compensates for Doppler shifts on the downlink signal 106 and then fully compensates for Doppler shifts on the uplink signal 110. Similar to the wireless communication system 200 illustrated in FIG. 2, the DEC 102 of FIG. 4 estimates the Doppler shift from the uplink transmitted signal 111. The DEC 102 then applies a first partial offset Doppler frequency shift 180 (schematic symbol $f_{P1}$ in FIG. 4) to the downlink compensated signal 120, which is of smaller magnitude and opposite sign as that of the downlink Doppler frequency shift 112. Therefore the first partial offset Doppler frequency shift 180 only partially compensates for the total downlink Doppler frequency shift 112 (schematic symbol $f_D$ in FIG. 4). That is, the first partial offset Doppler frequency shift 180 reduces the effect of the downlink Doppler frequency shift 112 on the downlink signal 106, but does not eliminate it.

Additionally, the DEC 102 also applies a second partial offset Doppler frequency shift 182 (schematic symbol $f_{P2}$ in FIG. 4) to the uplink compensated signal 122, wherein the sum of $f_{P1}$ plus $f_{P2}$ substantially equals $f_D$. As such, the DEC 102 fully compensates for the Doppler shifts on the uplink signal 110. That is, the sum of the first and second partial offset Doppler frequency shifts 180, 182 substantially eliminate the effect of the total downlink Doppler frequency shift 112 on the uplink signal 110.

More specifically in this embodiment, the DEC 102 will compare the center frequency of the uplink transmitted signal 111 with its own accurate reference device 103 to estimate the downlink Doppler frequency shift 112 ($f_D$), in similar fashion to the embodiment of FIG. 2. The DEC 102 may then add a first partial offset Doppler frequency shift 180 ($f_{P1}$) to the downlink received signal 107 to provide a downlink compensated signal 120 whose center frequency is substantially equal to: $f_{ref}^{DL}+f_D-f_{P1}$.

The first partial offset Doppler frequency signal 180 assists the user device 104 such that the user device 104 sees a reduced (or partially compensated) downlink Doppler frequency shift 184, which the user device 104 can more easily track and lock onto. For example, for a user device 104 and base station 102 that have a velocity of greater than 500 km per hour relative to each other, the downlink Doppler frequency shift 112 may be greater than a value that the user device can lock onto. For example, many user devices 104 cannot lock onto downlink signals 106 that are shifted more than 7 to 8 kHz. However, the first partially offset Doppler frequency signal 180 may partially compensate for the large (e.g. greater than or equal to 8 kHz) downlink Doppler frequency shift 112 and re-shift the center frequency of the downlink signal 106 such that it is less than or equal to a value that the user device can lock onto. For example, within 7 kHz of the original downlink reference frequency 126, therefore enabling the user device 104 to lock onto downlink signal 106.

The user device 104 then locks on to the downlink compensated signal 120 and, in similar fashion to the embodiment of FIG. 2, transmits the uplink transmitted signal 111 to the DEC 102, wherein the center frequency of the uplink transmitted signal 111 is substantially equal to: $f_{ref}^{UL}+f_D-f_{P1}$. In other words, the center frequency associated with the uplink transmitted signal 111 is $f_{ref}^{UL}$ shifted by the partially compensated Doppler frequency shift 184 of $f_D-f_{P1}$.

By comparing the center frequency of the uplink transmitted signal 111 with its own accurate uplink reference frequency generated from its accurate referenced device 103, the DEC system 102 will estimate the downlink Doppler frequency shift 112 ($f_D$). As the first partially offset Doppler frequency shift 180 ($f_{P1}$) is known to the DEC system 102, the DEC system 102 will then determine a second partially offset Doppler frequency shift 182 ($f_{P2}$), wherein $f_{P2}=f_D-f_{P1}$.

The DEC system 102 will then add an uplink offset Doppler frequency shift 186 to the uplink transmitted signal 111 to obtain the uplink compensated signal 122, which is then transmitted toward the base station 108. The uplink offset Doppler frequency shift 186 will be substantially equal in magnitude and opposite in sign to the second partially offset Doppler frequency shift 182 ($f_{P2}$) plus an uplink Doppler frequency shift 114 ($\alpha f_D$) that will occur when the uplink signal 110 is received by the base station 108 as the uplink received signal 123.

The uplink Doppler frequency shift 114 ($\alpha f_D$) will be substantially equal to the downlink Doppler frequency shift 112 ($f_D$) multiplied by the scaling factor 130, wherein the scaling factor 130 is proportional to the ratio of the uplink reference frequency 128 to the downlink reference frequency 126. The uplink signal 110, when transmitted by the DEC system 102, is an uplink compensated signal 122 that is transmitted toward the base station 108.

The uplink signal 110 received by the base station 108 is referred to as the uplink received signal 123. The uplink received signal 123 is a frequency-shifted version of the uplink compensated signal 122 that is transmitted by the DEC system 102. That is, the center frequency of the uplink received signal 123 is shifted from that of the center frequency associated with the uplink compensated signal 122 by an amount equal to the uplink Doppler frequency shift 114. Since the center frequency of the uplink compensated signal 122 equals the sum of the uplink reference frequency 128 and the negative of the uplink Doppler frequency shift 114, the center frequency of the uplink received signal 123, when it is received by the base station 108, will be substantially equal to the uplink reference frequency 128.

As described above, the DEC 102 must determine the frequency shift of either the downlink received signal 107, the uplink transmitted signal 111 or both. To do so, the DEC 102 can use characteristics of the LTE transmission signal to determine the frequency shift of the received signal. Generally, the frequency shift can be learned by measuring the phase change over time of the received signal relative to a known reference signal. There are a number of ways that the DEC 102 will have a known reference signal to compare to. Two such methods are described below. However, other methods of determining the frequency shift are possible and the present invention is not limited to the below referenced exemplary methods.

The cyclic prefix of an LTE Orthogonal-Frequency-Division-Multiplexing (OFDM) symbol can be used to measure the frequency shift. In an LTE transmission, a portion (i.e. a few information symbols) at the end of each OFDM symbol is repeated (sometimes opposite in sign) at the beginning of the OFDM symbol period. This is known as the cyclic prefix. In one embodiment, the DEC 102 can use correlation techniques to detect the start and end of an OFDM symbol. The DEC 102 can then determine the phase difference between information symbols in the cyclic prefix and the corresponding information symbols occurring at the end of the OFDM symbol. Because these information symbols should be identical, any phase difference measured between information symbols in the cyclic prefix and the information symbols at the end of the OFDM symbol is likely to have been caused by frequency shift. Thus, this phase change information coupled with the time difference between the start and end of the OFDM symbol can be used to calculate the frequency shift of the received signal.

With particular regard to the uplink transmitted signal 111, the LTE random access procedure can be used to measure the frequency shift. When attempting to attach to a base station 108, the user device 104 will perform a random access procedure, where it will transmit one of a known set of random access preamble sequences to the base station 108. Because the set of possible preambles is known, the DEC 102 can determine, via, for example, correlation techniques, which preamble sequence the user device 104 has transmitted. Once the DEC 102 knows which preamble sequence was transmitted by the user device 104, the DEC 102 can compare the change in the phase over time between the known reference preamble sequence and the preamble sequence transmitted by the user device 104 to determine the frequency shift.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A method of estimating and compensating for Doppler frequency shifts in a wireless communication system, the method comprising:
   providing an accurate reference device for generating an accurate reference frequency in a Doppler estimation and compensation (DEC) system, the DEC system being electrically connected to a user device;
   receiving within the DEC system one of a downlink signal from a base station and an uplink signal from the user device;
   comparing a center frequency of one of the downlink signal and the uplink signal to the accurate reference frequency;
   determining an estimate of a Doppler frequency shift associated with the one of the downlink signal and the uplink signal based on the comparing;
   adding an offset Doppler frequency shift of opposite sign as the Doppler frequency shift to the one of the downlink signal and uplink signal to provide a compensated signal; and
   transmitting the compensated signal to one of the base station and user device.

2. The method of claim 1 comprising:
   receiving within the DEC system a downlink signal transmitted from the base station, the downlink signal having its center frequency equal to an associated downlink reference frequency shifted by a downlink Doppler frequency shift;
   adding a downlink offset Doppler frequency shift to the downlink signal of substantially the same magnitude and opposite sign as the downlink Doppler frequency shift to provide a downlink compensated signal with its center frequency substantially equal to the downlink reference frequency; and transmitting the downlink compensated signal to the user device.

3. The method of claim 2 comprising:

receiving within the DEC system an uplink signal transmitted from the user device, the uplink signal with its center frequency equal to an uplink reference frequency;

adding an uplink offset Doppler frequency shift to the uplink signal to provide an uplink compensated signal, the uplink offset Doppler frequency shift being substantially equal in magnitude and opposite in sign to an uplink Doppler frequency shift that will occur when the uplink signal is received by the base station; and transmitting the uplink compensated signal to the base station such that the base station receives a signal whose center frequency is substantially equal to the uplink reference frequency.

4. The method of claim 3 wherein the uplink Doppler frequency shift is substantially equal to downlink Doppler frequency shift multiplied by a scaling factor that is proportional to the ratio of the uplink reference frequency to the downlink reference frequency.

5. The method of claim 4 wherein the downlink reference frequency is substantially equal to the uplink reference frequency and the scaling factor is substantially equal to 1.

6. The method of claim 3 comprising the user device providing an indication signal to the DEC system designating the base station as a desired base station out of a plurality of base stations, the desired base station being the single base station that the user device communicates with.

7. The method of claim 1 comprising:

receiving within the user device a downlink signal transmitted from the base station, the downlink signal having its center frequency substantially equal to a downlink reference frequency shifted by a downlink Doppler frequency shift;

receiving within the DEC system an uplink signal transmitted from the user device, the uplink signal having its center frequency substantially equal to an uplink reference frequency shifted substantially by the downlink Doppler frequency shift;

adding an uplink offset Doppler frequency shift to the uplink signal to provide an uplink compensated signal, the uplink offset Doppler frequency shift being substantially equal in magnitude and opposite in sign to the downlink Doppler frequency shift plus an uplink Doppler frequency shift that will occur when the uplink signal is received by the base station; and transmitting the compensated signal to the base station such that when the base station receives the uplink compensated signal its center frequency is substantially equal to the uplink reference frequency.

8. The method of claim 7 wherein the uplink Doppler frequency shift is substantially equal to the downlink Doppler frequency shift multiplied by a scaling factor that is proportional to the ratio of the uplink reference frequency to the downlink reference frequency.

9. The method of claim 8 wherein the downlink reference frequency is substantially equal to the uplink reference frequency and the scaling factor is substantially equal to 1.

10. The method of claim 9 comprising the user device having an accurate reference device for generating an accurate reference frequency.

11. The method of claim 1 comprising:

receiving within the DEC system a plurality of downlink signals transmitted from a plurality of base stations, the plurality of downlink signals each having a center frequency equal to a downlink reference frequency, the plurality of downlink signals also each having its center frequency shifted by a downlink Doppler frequency shift;

adding a downlink offset Doppler frequency shift to each of the plurality of downlink signals of opposite sign as the downlink Doppler frequency shift associated with each of the plurality of downlink signals to provide a plurality of downlink compensated signals whose center frequencies are substantially equal to the downlink reference frequency; and transmitting the plurality of downlink compensated signals to the user device.

12. The method of claim 11 comprising:

the user device designating a base station out of the plurality of base stations as a desired base station, the desired base station being the single base station that the user device communicates with;

receiving within the DEC system a single uplink signal transmitted from the user device, the uplink signal having its center frequency substantially equal to an uplink reference frequency;

adding an uplink offset Doppler frequency shift to the uplink signal to provide an uplink compensated signal, the uplink offset Doppler frequency shift being substantially equal in magnitude and opposite in sign to an uplink Doppler frequency shift that will occur when the uplink signal is received by the desired base station; and transmitting the uplink compensated signal to the desired base station such that the desired base station receives a combined signal whose center frequency is substantially equal to the uplink reference frequency.

13. The method of claim 12 wherein the uplink Doppler frequency shift is substantially equal to downlink Doppler frequency shift associated with the desired base station multiplied by a scaling factor that is proportional to the ratio of the uplink reference frequency to the downlink reference frequency.

14. The method of claim 13 wherein the downlink reference frequency is substantially equal to the uplink reference frequency and the scaling factor is substantially equal to 1.

15. The method of claim 1 comprising:

receiving within the DEC system a downlink signal transmitted from the base station, the downlink signal having a center frequency equal to a downlink reference frequency ($f_{ref}^{DL}$) shifted by a downlink Doppler frequency shift ($f_D$);

adding a first partial offset Doppler frequency shift ($-f_{P1}$) to the downlink signal of smaller magnitude and opposite sign as the downlink Doppler frequency shift to provide a downlink compensated signal transmitted to the user device;

receiving within the DEC system an uplink transmitted signal transmitted from the user device, the uplink transmitted signal having a center frequency substantially equal to an uplink reference frequency ($f_{ref}^{UL}$) shifted by the sum of the Doppler frequency shift plus the first partial offset Doppler frequency shift ($f_D-f_{P1}$);

comparing the center frequency of the uplink transmitted signal to the accurate reference frequency;

determining a second partial offset Doppler frequency shift ($f_{P2}$) based on the comparing, wherein the second partial offset Doppler frequency shift is substantially equal to the downlink Doppler frequency shift plus the first partially offset Doppler frequency shift ($f_{P2}=f_D-f_{P1}$).

16. The method of claim 15, comprising adding an uplink offset Doppler frequency shift to the uplink transmitted signal to obtain an uplink compensated signal, the uplink offset Doppler frequency shift being substantially equal in magnitude and opposite in sign to the second partial offset Doppler frequency shift ($f_{P2}$) plus an uplink Doppler frequency shift ($\alpha f_D$) that will occur when the uplink compensated signal is received by the base station as an uplink received signal.

17. The method of claim 16, wherein the uplink Doppler frequency shift ($\alpha f_D$) is substantially equal to the downlink Doppler frequency shift ($f_D$) multiplied by a scaling factor ($\alpha$), the scaling factor being proportional to the ratio of the uplink reference frequency ($f_{ref}^{UL}$) to the downlink reference frequency ($f_{ref}^{DL}$).

18. The method of claim 15, wherein the downlink Doppler frequency shift is greater than a value that the user device can lock onto and the sum of the downlink Doppler frequency shift plus the first partial offset Doppler frequency shift is less than or equal to the value that the user device can of lock onto.

19. The method of claim 1, wherein the accurate reference device generates an accurate reference frequency independent of a center frequency of the downlink signal.

20. The method of claim 1 wherein the accurate reference frequency generated by the accurate reference device has an accuracy range of 100 ppb or less.

* * * * *

UNITED STATES PATENT AND TRADEMARK OFFICE
CERTIFICATE OF CORRECTION

PATENT NO. : 10,454,533 B1
APPLICATION NO. : 16/134340
DATED : October 22, 2019
INVENTOR(S) : Kogiantis et al.

Page 1 of 1

It is certified that error appears in the above-identified patent and that said Letters Patent is hereby corrected as shown below:

On the Title Page

Item (73): Delete "VENCORE LABS, INC." and insert -- PERSPECTA LABS INC. --

Signed and Sealed this
Twenty-sixth Day of November, 2019

Andrei Iancu
*Director of the United States Patent and Trademark Office*